United States Patent
Aboel-Nil et al.

(10) Patent No.: US 11,907,909 B2
(45) Date of Patent: *Feb. 20, 2024

(54) SYSTEM AND METHOD FOR MANAGING DATA ACROSS MULTIPLE ENVIRONMENTS

(71) Applicant: MessageOne, LLC, Austin, TX (US)

(72) Inventors: Samy M. Aboel-Nil, Austin, TX (US); Dane O. Knecht, Austin, TX (US); Igor Postelnik, Austin, TX (US); Scott B. Kovner, Cedar Park, TX (US)

(73) Assignee: MessageOne, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,214

(22) Filed: Nov. 14, 2022

(65) Prior Publication Data

US 2023/0142521 A1 May 11, 2023

Related U.S. Application Data

(63) Continuation of application No. 16/994,057, filed on Aug. 14, 2020, now Pat. No. 11,531,967, which is a continuation of application No. 11/935,963, filed on Jan. 18, 2008, now Pat. No. 10,783,498.

(60) Provisional application No. 60/864,527, filed on Nov. 6, 2006.

(51) Int. Cl.
*G06Q 10/107* (2023.01)
(52) U.S. Cl.
CPC .................. *G06Q 10/107* (2013.01)
(58) Field of Classification Search
CPC .................................... G06Q 10/107
See application file for complete search history.

(56) References Cited

U.S. PATENT DOCUMENTS

| 5,377,354 | A  | * | 12/1994 | Scannell  | H04L 51/42 706/45 |
| 6,591,290 | B1 | * | 7/2003  | Clarisse  | G06F 9/547 709/205 |
| 6,640,301 | B1 | * | 10/2003 | Ng        | H04L 63/12 709/228 |
| 7,673,327 | B1 | * | 3/2010  | Polis     | G06F 16/958 713/153 |
| 8,713,109 | B1 | * | 4/2014  | Baker     | H04L 51/42 709/205 |
| 2002/0169876 | A1 | * | 11/2002 | Curie     | G06Q 10/06 709/229 |
| 2004/0167941 | A1 | * | 8/2004  | Prahlad   | H04L 61/4523 |
| 2004/0220980 | A1 | * | 11/2004 | Forster   | G06F 11/1451 |

(Continued)

OTHER PUBLICATIONS

Notice of Allowance dated Aug. 11, 2022, filed in U.S. Appl. No. 16/994,057, pp. 1-4.

(Continued)

*Primary Examiner* — Chris Parry
*Assistant Examiner* — Hassan A Khan

(57) ABSTRACT

The present invention discloses a system and method for data management whereby a data management application manages data across a managed service environment, a mail server environment, and a client environment. The present invention allows a customer to optimize data management functions such as archiving, recovering, monitoring, authenticating, synchronizing, transferring, copying, stubbing, chunking, harvesting, and securing.

20 Claims, 3 Drawing Sheets

(56) References Cited

U.S. PATENT DOCUMENTS

| | | | |
|---|---|---|---|
| 2005/0050175 A1* | 3/2005 | Fong | G06F 9/44505 |
| | | | 709/220 |
| 2005/0262235 A1* | 11/2005 | Childress | G06F 9/5033 |
| | | | 709/224 |
| 2006/0053200 A1* | 3/2006 | McCown | H04L 67/568 |
| | | | 709/206 |
| 2006/0136420 A1* | 6/2006 | Gandhi | G06F 16/9574 |
| | | | 707/999.009 |
| 2007/0180033 A1* | 8/2007 | Singh | G06Q 10/107 |
| | | | 709/206 |

OTHER PUBLICATIONS

Terminal Disclaimer filed on Aug. 1, 2022, filed in U.S. Appl. No. 16/994,057, pp. 1-2.
Terminal Disclaimer approved on Aug. 1, 2022, filed in U.S. Appl. No. 16/994,057, p. 1.
Response to Non-Final Office Action dated Jul. 18, 2022, filed in U.S. Appl. No. 16/994,057, pp. 1-9.
Non-Final Office Action dated Mar. 18, 2022, filed in U.S. Appl. No. 16/994,057, pp. 1-5.

\* cited by examiner

SYSTEM AND METHOD FOR MANAGING DATA ACROSS MULTIPLE ENVIRONMENTS

CROSS-REFERENCE TO RELATED APPLICATIONS

This non-provisional application claims priority based upon prior U.S. Provisional Patent Application Ser. No. 60/864,527 filed Nov. 6, 2006 in the name of Samy M. Aboel-Nil, Dane O. Knecht, Igor Postelnik and Scott B. Kovner, entitled "Electronic Data Management," the disclosure of which is incorporated herein by reference.

BACKGROUND OF THE INVENTION

Data management systems have traditionally existed as either enterprise software or managed service solutions. Enterprise software is typically deployed and maintained on an enterprise server that is encompassed within a mail server environment. A mail server environment may include multiple mail servers and enterprise servers. In addition, a mail server environment may consist of a single mail server environment at one location or multiple distributed mail server environments across many locations. The mail server environment is distinct from the client environment which includes desktops, laptops, personal digital assistants and other end user electronic communication and storage devices. Existing enterprise software solutions provide data management for the mail server environment and the client environment. However, since enterprise software is encompassed within the mail server environment, existing enterprise software solutions either cannot, or are not well suited to, provide certain services outside of the mail server environment and the client environment, such as filtering, routing, and standby services. In particular, existing enterprise software solutions cannot provide certain messaging services outside of the mail server environment and the client environment. As a result, the effectiveness of existing enterprise software solutions as a data management system is severely limited both for a single mail server environment and client environment and for distributed mail server environments and client environments across many locations.

Existing managed service solutions, on the other hand, are typically delivered and managed within a managed service environment that is separate and distinct from the mail server environment and the client environment. For example, existing managed service solutions, such as the management of archival databases that contain customer information, are typically operated and maintained by a managed service provider within that provider's managed service environment. Since existing managed service solutions reside within a provider's managed service environment, existing managed service solutions are (i) typically single environment solutions with little or no software running in the mail server environment or the client environment and (ii) only loosely coupled with the mail server environment and the client environment. As a result, the effectiveness of existing managed service solutions as a data management system is extremely limited.

The following are illustrative examples of limitations of existing data management systems that exist as either enterprise software solutions or managed service solutions:

Archiving. Traditionally, customers must choose to either archive data locally in their own mail server environment with enterprise software or choose a managed service vendor who archives the customer's data within the vendor's managed service environment. Customers who archive messages in their mail server environment with enterprise software usually employ a tape or electronic backup system that allows the customer to restore messages from the backup system in the event of a data store corruption, hard drive failure, or other data loss. Such backup systems, however, can only return messages to the point where the backup was last captured. Consequently, the effectiveness of such backup systems is limited by the frequency of the backups and the continued integrity of the backup system. With existing managed service solutions, copies of customer messages can be automatically stored at a vendor's managed service environment. Since existing managed service solutions involve off-site storage and management by a third party, the frequency of backups is not as great of a concern and the risk that the integrity of stored data could be compromised is reduced. However, the cost of archiving data with existing managed service solutions is typically much higher than with existing enterprise software solutions. At the same time, the customer's ability to recover and restore archived data from a managed service environment is typically slower with existing managed service solutions that with existing enterprise software solutions depending on factors such as the bandwidth availability between the managed services environment and the mail server environment. Therefore, there is a need for a data management system that allows a customer to combine the advantages of archiving in their particular mail server environment with the advantages of archiving in a managed services environment.

Message Routing. The routing of an electronic message from the client environment to the mail server environment and, ultimately, to the intended recipient of the message typically occurs through enterprise software operating within the mail server environment. The enterprise software evaluates the domain of the recipients email address and performs a Domain Name System query for that domain's public Mail Exchange ("MX") records. Such queries often return multiple MX records. The enterprise software will then attempt to route the email to the lowest weight (highest priority) MX record and, if the lowest weight record is unavailable, the enterprise software falls back to higher weighted records. This routing approach is sufficient for infrequent email usage and small email infrastructures. It is not efficient, however, for situations involving frequent email usage, large email infrastructures, and dynamic systems involving, for example, migrations of users' mailboxes between multiple mail servers, multiple mail server environments and multiple client environments. Therefore, there is a need for a data management system with efficient and dynamic message routing.

New User Authentication. Customers are often reluctant to deploy any components that require their end users to learn separate passwords. Existing managed service solutions, however, require end-users to obtain a separate log-in password that is managed by the managed service vendor. Separate passwords are often burdensome to end users because separate passwords can be difficult to remember, keep confidential, and may impose different complexity requirements. Therefore, there is a need for a data management system that can authenticate end users without requiring separate passwords.

Email Continuity. In the event of a disruption to the normal operation of the mail server environment or the client environment, existing managed service solutions typically enable end users to access their email during the disruption through use of a web interface that accesses a backup email system within the managed service environment. Use of the web interface is often burdensome to end users because the web interface is different from the interface of the email application to which they are accustomed. In some cases, users need, or are forced, to access to the backup email system through the web interface because they can only access the backup email system from locations that are outside of the mail server environment or the client environment, such as a home computer or a backup/recovery facility. In other cases, however, the mail server environment and the client environment are not disrupted to a degree that would prevent users from accessing a backup email system through the mail server environment and the client environment—if such a backup email system was so accessible. In such situations, existing managed service solutions still require users to access a backup email system through a separate web interface rather than the interface of their typical email application. Therefore, there is a need for a data management system that allows users to access a backup email system during minor disruptions to the mail server environment or client environment and through the interface of the end users' typical email application rather than a web interface.

Searching. A customer's ability to search archived data is limited under existing enterprise software solutions and managed services solutions. For example, end users are accustomed to searching for email using their email application interface. Existing enterprise software and managed service solutions, however, require end users to use a separate and different interface to access archived messages. Existing enterprise software and managed service solutions also require users to take additional steps, such as using a separate login and authentication processes, prior to accessing archived messages. Customers would prefer that their end users be impacted as little as possible by the archiving of email content. Therefore, there is a need for a data management system that allows end users to seamlessly search archived messages.

New User Provisioning for Managed Service Environment. Providing new users access to existing enterprise software and managed service solutions is often time consuming and expensive for customers. For example, such provisioning requires customers to update information in a variety of disparate applications and existing managed service providers often require customers to manually update information for new users. Therefore, there is a need for a data management system that provides an automated method of providing access to new users.

The present invention provides a data management system that solves the above existing problems presented by existing enterprise software solutions and managed service solutions. In addition, the present invention provides advantages that neither existing enterprise software solutions nor existing managed service solutions are capable of providing.

BRIEF SUMMARY OF THE INVENTION

In accordance with the present invention, a system and method for data management are provided whereby a data management application manages data across a managed service environment, a mail server environment, and a client environment. The present invention allows a customer to optimize data management functions such as archiving, recovering, monitoring, authenticating, synchronizing, transferring, copying, stubbing, chunking, harvesting, and securing.

An technical advantage of the present invention is that it allows a customer to combine the advantages of archiving in their particular mail server environment with the advantages of archiving in a managed services environment.

Yet another technical advantage of the present invention is that it provides efficient and dynamic message routing in situations involving frequent email usage, large email infrastructures, and dynamic systems involving, for example, migrations of users' mailboxes between multiple mail servers, multiple mail server environments and multiple client environments.

Still another technical advantage of the present invention is that it can authenticate end users without requiring separate passwords.

Still another technical advantage of the present invention is that it allows users to access a backup email system during minor disruptions to the mail server environment or client environment through the interface of the end users' typical email application rather than a web interface.

Still another technical advantage of the present invention is that allows end users to seamlessly search archived messages across the managed service environment, the mail server environment, and the client environment.

Still another technical advantage of the present invention is that provides an automated method of providing access to new users.

Still another technical advantage of the present invention is that it provides management of multiple data types such as data files, voice files, email messages, instant messages, copies of data, fingerprints of data, indexes of data, and metadata across the managed service environment, the mail server environment, and the client environment.

Still another technical advantage of the present invention is that it provides management of data consisting of archiving, recovering, monitoring, authenticating, synchronizing, transferring, copying, stubbing, chunking, harvesting, and securing across the managed service environment, the mail server environment, and the client environment.

DETAILED DESCRIPTION

Figure 1:
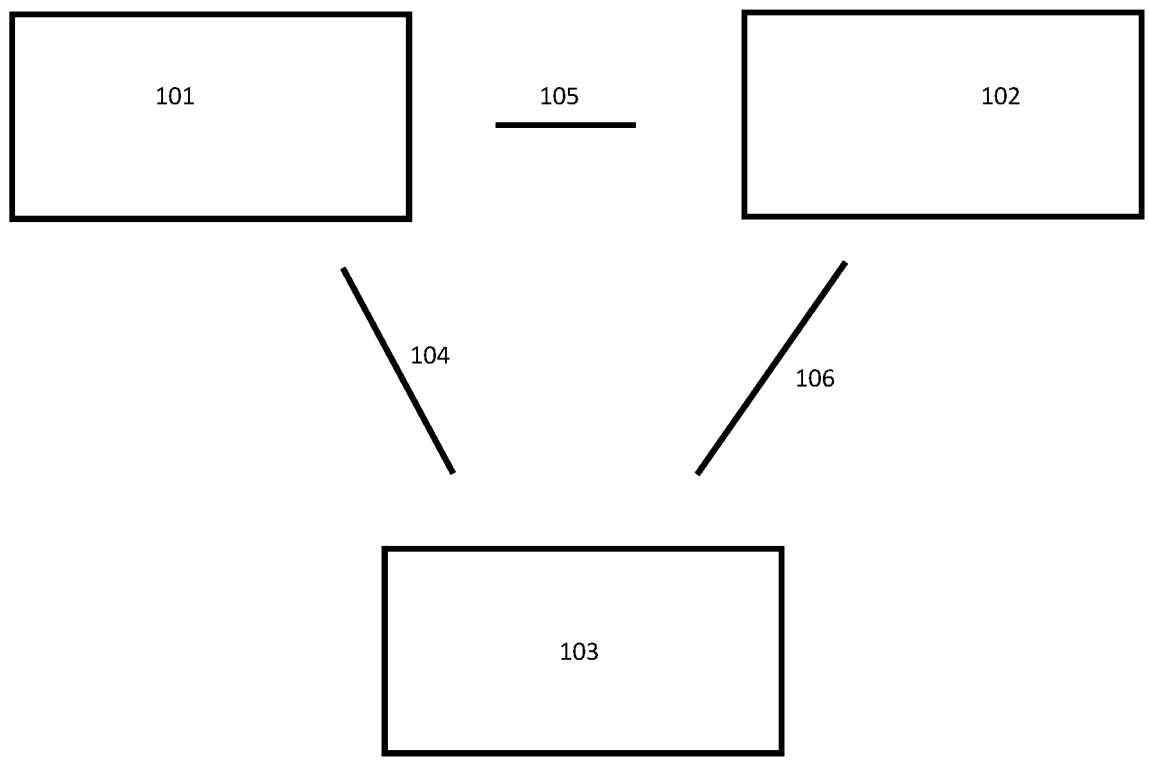
FIG. 1 is a diagram illustrating the managed service environment, the mail server environment, and the client environment in one embodiment of the present invention.

Broadly described, the present invention provides a system and method for data management whereby a data management application manages data across a managed service environment, a mail server environment, and a client environment. A managed service environment includes services operated by a managed service provider such as off-site data centers. A mail server environment includes messaging servers, such as a corporate email server using Microsoft Exchange, and enterprise software servers whether located in one or more locations or inside or outside the customer's premises. A client environment includes end user client devices such as desktops, laptops, personal digital assistants and other wireless device. As a person of ordinary skill in the art will recognize, use of the term "message" herein is often used to refer to data, or a portion of data, generally.

I. Storage Architecture for Data Management

In one embodiment, the present invention has a storage architecture that encompasses multiple environments. In this embodiment, data, or portions of data such as email attachments, are removed from the mail server environment and placed at another location, such as in a storage location. Pointers to the data are then placed on the customer's email server. A message that has been subject to such removal and replacement is referred to herein as a "stubbed" message. The present invention determines the number of copies of a stubbed message and identifies the various locations in which a stubbed message resides The present invention allows stubbed messages to reside in different locations, including locations in different environments. For example, the present invention can allow a copy of a stubbed message to reside on an enterprise server within the mail server environment while managing a second copy of the message off-site within a managed service environment. In this example, the local copy of the message is used for fast message retrieval and the second, off-site copy serves as a backup copy of the original message for disaster recovery. In another embodiment, the present invention routes messages to different managed service environments based on specific user-defined routing attributes such as a specific server, department, user, or country. In this embodiment, for example, the present invention may route messages for storage in various global data centers based on country-specific rules. In another embodiment, the present invention may use a message stored on an enterprise server within the mail server environment to recover lost messages that have been deleted from a primary email server. In the event of the loss of an enterprise server within the mail server environment, the present invention can move copies of the messages from a managed service environment directly to an email server or to an enterprise server within the mail server environment.

A. System Manages Message Authenticity Data

In one embodiment, the present invention employs multiple environments to flexibly store data authenticity information. In one embodiment, digital "checksums" or "finger prints" are calculated for each message and then stored either with the archived message or in a separate location. Alternatively, the attributes of individual messages, such as the message headers, identifier, size, and a calculated "checksum", can be stored in various places based on customer requirements. The present invention can also retrieve the message attributes, and in particular the checksum, to verify that archived messages are authentic and have not been tampered with. For example, the present invention may verify the authenticity of a message by comparing the checksum and size of the message with that of an archived copy of the message stored in the managed service environment. The present invention allows the transfer and storage of the copy of a message to the managed service environment to be implemented in a flexible manner, such that: (i) the attributes are calculated before transfer or upon arrival of the message to the managed service environment; (ii) the attributes are stored in the managed service environment, the attributes are stored by enterprise software in the mail server environment, the entire message is stored at the managed service environment, only portions of the message are stored at the managed service environment, or some combination thereof; and (iii) the attributes are captured, transferred, and stored in a variety of formats, such as plain text or encrypted formats.

As an example, in one embodiment the present invention initially captures a message from the email system and calculates a digital fingerprint. This fingerprint is then stored in a separate environment from the original message. At a later time, the present invention can verify the authenticity of a copy of the message by comparing the digital signature of the copy with the signature of the message calculated when the message was first captured. The digital signature may also be stored in a separate environment from the original message. For example, a message may be captured and stored on an enterprise server within the mail server environment while the digital signature may be stored in the managed service environment. In this manner, the present invention advantageously provides a mechanism for the determining the authenticity of a message without requiring that the entire message be stored outside of the mail server environment or the client environment. In another embodiment, the entire message may be stored within the managed service environment and the digital signature may be stored within the mail server environment or the client environment in order to reduce the volume of storage in the mail server environment.

B. User Selection of Storage Location

The present invention allows a customer to easily create policies that determine the optimal environment for storage of data. For example, the present invention allows a customer, without reducing the functionality of other aspects of the invention, to: (i) implement all storage in the managed service environment; (ii) implement all data storage in the mail server environment; (iii) implement a hybrid storage model by, for example, storing older messages in the managed service environment for archival purposes, but store more recent messages in the mail server environment or the client environment; or (iv) store copies of all data at both the managed service environment and either the mail server environment or the client environment in order to have rapid access to all messages locally and archived copies remotely for disaster recovery.

C. Archived Data Accessible to Multiple Applications

It will be recognized by those skilled in the art that, in various embodiments of the present invention, stored messages are accessible by multiple applications and services. For example, the present invention allows the following types of applications and services to access stored messages: (i) archiving; (ii) storage management; (iii) recovery, such as applications or services that accelerate the recovery of data into the mail server environment; (iv) email continuity, such as applications or services that provide access to historical email and ensure that email services can be restored quickly and easily by leveraging a backup email system; and (v) client applications or services that provide end user access to data such as native messaging applications, wireless applications, server applications, and desktop applications.

D, Multiple Service Levels for Archive Data Storage in the Managed Service

The present invention can provide multiple levels of service for data storage. For example, different environments can provide different levels of service. In addition, the service level for each environment can be determined based on a variety of factors such as data age, data importance, the customer's tolerance for cost for storage or any number of the following criteria: (i) frequency of backup; (ii) speed of search; (iii) feature set exposed by the full text index; (iv) availability of data for search after capture; (v) high availability; (vi) level of encryption; (vii) compression; (viii)

level of redundancy and location (local disk vs. offsite backup); (ix) RAID level of storage; and (x) type of storage medium (e.g. write once, read many (WORM) storage or tape storage).

The present invention is particularly advantageous to customers that are subject to more than one body of data privacy laws. For example, a customer's mail server environment, client environment, and managed service environments may individually or collectively span, and store protected personal data in, different states or countries. The present invention allows a customer to define policies that dictate where protected personal data resides for each of their different storage or mailbox environments. In addition, the present invention provides customers a single point of management over functions such as storing and searching of such data across the multiple environments. For example, the present invention allows customers to search and retrieve information across various storage locations in multiple environments. Such searches return aggregated results for a seamless presentation to the customer.

E. Policy Impact Analysis

The present invention assists customers in understanding how various policy changes would impact certain aspects of the data management system. In one embodiment, the present invention includes a policy impact analysis tool that allows customers to run "what if" scenarios before implementing a single policy or set of policies. For example, the policy impact analysis tool may be used to analyze various storage or routing scenarios and can take into account whether copies of some messages might already exist in multiple locations or environments. The policy impact analysis tool can also determine the impact of a stubbing policy. For example the tool can estimate how much email, in terms of its size and percentage of a data store that it occupies, would be impacted by the implementation of a stubbing policy that specifies factors such as number of mailboxes, size of attachments, message age, and last access date. Importantly, the policy impact analysis tool informs customers of the amount of any reduction to their primary message storage and how storage in each environment would be effected.

F. Chunking of Archive Storage

As the amount of stored data becomes large, the present invention can optimize such storage by aggregating, also referred to herein as "chunking", the stored data into units for the purpose of streamlining the retrieval and storage of the data. In one embodiment, the present invention alters the unit of storage on a case by case basis depending on the target storage environment, the application, or quality of service. For example, the present invention may aggregate multiple messages into a single unit of storage or break large messages into smaller units of storage. In some cases, small messages are only a few bytes in size, but due to their volume and system characteristics of the mail server environment, consume a significant amount of storage space. The present invention can aggregate sets of such smaller messages into larger units in situations in which such aggregating will help optimize storage.

G. User Premise Storage in the Mail Server Environment

The present invention also allows mail servers within the mail server environment to be used for data storage. In one embodiment, for example, the mail server environment can serve as a local message archive or "local cache" that stores messages for a number of days that is defined by the customer. The customer then has the ability to extract these messages from the local cache and restore the messages to the primary mail server. As a result, the messages can be extracted and restored (i) faster than if they were stored in the managed service environment; (ii) without less use of the bandwidth necessary to communicate between the mail server environment and the managed service environment; (iii) without passing through the firewall guarding the mail server environment; and (iv) even in the event of a failure of the customer's Internet connection. In addition, the local cache may also serve as a method for disaster recovery by providing for the redundant storage of messages recently stored in the managed service environment. The present invention also allows a customer to select when messages are stored in the local cache or allow the present invention to automatically choose the storage location based on algorithms, such as "most recently used" algorithms.

In other embodiments, (i) recently stubbed messages, rather than the messages themselves, are stored in the local cache and older stubbed messages are stored in the managed service environment; (ii) the local cache is used to validate messages sent to the managed service environment for archiving; (iii) the local cache storage is optimized based on the system topology; (iv) the local cache is used to store message attributes or checksums to verify the authenticity or completeness of messages; and (v) the local cache is used to temporarily store copies of messages being transferred from the mail server environment to the managed service environment until such transfers are confirmed by the system. In each of these embodiments, the local cache compliments the primary storage provided in the managed service environment.

H. Client Environment Storage

The present invention also allows the client environment to be used for data storage. In one embodiment, the present invention creates a stubbed message and sends some portion of the content of the stubbed message to the mail server environment for storage. Consequently, only a pointer (or other tracking mechanism) remains in the client environment. When a user attempts to access the stubbed message, the user is either provided a link to the remote content or the present invention will seamlessly extract the content from the mail server environment, if access to the remote content is available. This feature has the benefit of reducing the size of the data storage necessary at the mail server environment by sharing storage across environments. Storage at the mail server environment is often costly because of the overhead in maintaining a large primary data storage center. This embodiment allows customers to reduce such costs by using data storage within the client environment, on each user's desktop computer for example, to store a portion of stubbed messages. In one embodiment, the customer may optimize the storage by selecting the amount of storage that occurs in each environment or by requesting that the present invention automatically determine optimal locations based on algorithms, such as "most recently used" algorithms.

II. Capturing and Transferring Messages Between Environments

The present invention also allows data to be transferred between environments for specific uses. For example, data stored in the managed service environment may be retrieved from the managed services environment and transferred to a mail server environment to allow an end user access to the data. In addition, data may be transferred from the primary mail servers within the mail server environment to the managed service environment for storage.

A. Operations for Transfer Between Environments

The present invention allows users to apply certain operations to data, before or after a transfer, in order to optimize the transfer. For example, a user may elect, or the invention may automatically, (i) compress data before transfer; (ii) encrypt data before transfer; and (iii) decompress and decrypt data after transfer. In one embodiment, messages, including attachments, may be sent from the managed service environment to the mail server environment in an encrypted and compressed format and, after arriving at the mail server environment, decrypted and decompressed. In another embodiment, only the attachments to messages are compressed and encrypted prior to transfer. These transfer operations provide the benefit of increasing security, minimizing bandwidth costs, and lowering consumption of processing power at the managed service environment.

B. Use of Local Proxy or Cache for Data Retrieval

The present invention also allows for software located on the mail server environment, such as the commercially available MessageOne VaultBox, to serve as a local cache and proxy for data transfer. For example, software in the mail server environment can be used to aggregate requests for message retrieval by individual users of the mail server environment, in order to (i) control bandwidth usage between the mail server environment and the managed service environment and (ii) optimize storage on the local cache to include the most commonly requested messages.

C. Real-Time Capture

The present invention also allows for software located in the mail server environment, such as the commercially available MessageOne VaultBox, to serve as a transfer mechanism to rapidly transfer messages from the primary mail server in the mail server environment to the managed service environment or the local cache. This feature provides for greater system continuity by improving the speed in which messages are archived in the managed service environment.

D. Historical Import (Harvesting)

In one embodiment, the present invention includes a historical import mechanism that migrates older data from an existing data store into a new data archive software or service. In this embodiment, a user can: (i) build and queue up "import jobs" using a console scheduler; (ii) backfill for a given retention period or for specific set of dates; (iii) review the current status of a migration on a system console; (iv) set bandwidth limits for the migration, such as a number of bytes transferred per hour between the historical data store and the new data archive; and (v) control the active hours that a migration is active (e.g. only import at off-peak times) to minimize impact on existing systems.

(1) Mailbox Scanner. In one embodiment, the present invention employs a mail scanner to crawl messages in a data store. The mail scanner may be used in connection with the migration or stubbing process. For example, the mailbox scanner can be used for: (i) copying messages to an archive in a data center in a separate environment; (ii) replacing, or "stubbing", part of the contents of certain messages, such as with a hypertext transfer protocol link to a copy of the full message in the managed service environment; (iii) correlating messages in mailboxes within the client environment with messages already stored in the mail server environment or managed service environment; and (iv) restoring messages parts that have been stubbed, using the content archived in the managed service environment. The present invention also allows for the mail scanner: (a) to be scheduled to run during non-peak hours; (b) to be stopped and resumed several times during the course of a complete mailbox scan, and (c) to detect and import changes that were made in a mailbox while in a suspended state. In one embodiment, the mail scanner uses time slices to scan the mailboxes, taking mail for a particular time period for all users before advancing to the next time period: The mail scanner also has the capability to run partial tasks, saving the state of the scan between partial runs of the scanning task.

(2) Persistent Iterator. The present invention provides a method for saving the state of iterators even though the users, messages, folders, and selected user sets can change between partial tasks. Iterators in standard libraries would simply invalidate a current iterator upon the change between partial tasks. The present invention instead recovers the current iterator, by: (i) keeping the list of user sets sorted on a unique key, and moving to the next key if the current one is no longer valid; (ii) keeping the list of users sorted, again advancing to the next if no longer valid; and (iii) including on messages that have arrived in the current folder for the current time period since the last partial task. As a result, the present invention allows a user to proceed through a list of messages, folders, and users even if there have been significant changes to the data set.

(3) Stubbing Process (Sub Process of Mailbox Scanner). The process of stubbing messages is responsible for removing part or all of a message from the mail server within the mail server environment and storing the message or portions of the message in other environments. The solution may also create a link from the email server to the new environment so that the message may continue to be easily accessed. In one embodiment, when the server determines a message needs to be stubbed, it will first check a message matching checksum database to determine if the message was already transferred to a managed service environment under another policy. Messages found in the archive of the managed service environment are not resubmitted. This step prevents wasted resources such as bandwidth and storage. In another embodiment, the process of sending the data to the archive in the managed service environment is schedulable with granular controls to adjust the process such as message throughput, disk margin, transfer service threads. The managed service environment also has controls in place to manage the throughput of user import utilities to avoid overloading the archive in the managed service environment.

E. Generic API for Submitting Data across Environments

The present invention allows users to submit data to the archive of the managed service environment from any server within the mail server environment or any component within the customer environment. As a result, users may optimize such submissions by choosing different environments, and the servers and components within those environments, based on the advantages offered by submitting through each environment. For example, a mail server that operates within the secure mail server environment can choose to submit data to a vault box and allow the vault box to manage the process of compressing, encrypting, and transferring to the managed service environment. A user may choose to submit data from various servers within the mail server environment or various components within the customer environment in connection with: (i) instant messaging archiving; (ii) archiving data in connection with Microsoft's SharePoint software; (iii) archiving while maintaining access to public folders; and (iv) importing from historical tape data.

F. Active Recovery

In one embodiment, a customer may select a number of criteria for the purpose of selecting archived data that the user desires to extract to the mail server environment. For example, a customer may select archived messages by defining servers, storage groups, mailboxes, time ranges, system events, or other parameters. In addition, if auxiliary metadata is available, a customer can select archived messages by having the present invention search an event log in order to determine the last backup times or outage times. If an event log is not available, the customer may supply a date range for selecting archived messages. Additionally, the customer may select archived messages by selecting specific mailboxes using group/server/store capabilities identified through synchronization. The customer can also specify the type of data to be restored such as contact information, calendar appointments, and email messages.

Customers also have multiple options for recovering messages from the archive of the managed service environment to the mail server environment. In one embodiment, the present invention retrieves messages from the local cache where possible due to faster performance but will also retrieve from the managed service environment in the event of local unavailability. The software then extracts messages from the local cache and restores the messages directly to the mail server environment, thereby providing recovery of missing data.

In another embodiment, a recovery manager requests encrypted messages in blocks from the managed service environment and then requests a key to decrypt and restore the messages. The present invention can also employ multiple recovery managers for this processing. In such cases, duplication is avoided by having the data management application keep track of which messages have been recovered.

In another embodiment, the customer downloads a full recovery archive, complete with content, from the managed service environment. The customer may then copy the archive to as many recovery managers as is necessary to complete the processing in a desired time period. Each recovery manager performs a separate recovery based on manually or automatically established limits such as a set of users, a set of exchange servers or load balancing. In one embodiment, each recovery manager must still contact a server within the managed service environment to retrieve the private key.

In another embodiment, customers download archived data from the managed service environment in a format that allows the customers to easily import the archived data into the mail server environment using their native email client. For example, a user of Microsoft Exchange might down load the archived email as a PST file.

In another embodiment, the recovery manager also recovers and restores certain status information regarding the messages such as whether messages were read, deleted, or moved to folders.

In another embodiment, customers may choose alternative recovery methods for placement of message back into the mail server environment. For example, customers may place all of the recovered messages in an alternate folder from where the recovered messages would typically exist in the mail server environment. Such an alternate folder might be named "Recovery" or, in the case of discovery for litigation, "Email Discovery for Used". Customers might also combine the email from multiple users to be recovered to a single target mailbox.

In another embodiment, as the recovery manager restores data to the mail server environment, the recovery manager will process different types of data. The recovery manager must first correctly identify the data. The recovery manager then processes the data into the correct format for use in the mail server environment. Messages within single archive can, for example, contain messages and message attachments that have a mime type such as "message/delivery-status", "text/rfc822-headers", "text/x-card" (attached contact), or "text/calendar" (meeting invitation). The recovery manager adjusts its processing to accommodate these various mime types. For example, a file with the mime ".vcf" should be added to a user's contacts folder and a voicemail file should be correctly associated with other voicemails.

In situations where a recovery point cannot be narrowed to specific time using event logs, a customer may choose to select a date range that begins slightly before the time of failure. In such cases, some of the recovered messages will likely already exist in the mail server environment. However, the recover manager avoids restoring duplicate messages by verifying whether messages already exist in a user mailbox. The recovery manager can also identify messages that already exist in the mail server environment even if a message is located in separate individual's mailbox. For example, if one email was sent to five separate individuals, the recovery manager can reduce processing and delivery times by only recovering and restoring one instance of the email. The recovery manager can then make the single instance of the email available to the mail boxes of all five separate individuals.

If a customer is not able, or does not desire, to restore archived messages to the original email system within the mail server environment, the recovery manager will evaluate the user's messages that were created in the original email system and attempt to auto match the previous user profiles to new profiles in the new email system within the mail server environment. Alternatively, if the system is not able to successfully match user profiles, the recovery manager will allow the user to manually map user profiles between original and new email systems. For example, a migration administrator may specify "user1 maps to user2" and the recovery manager would then restore the email of user1 in the original email system to the mailbox of user2 in new email system.

III. Data Access Across Environments

A. Scoped Reviewer Extranet

In one embodiment, a customer may limit access to specific data to individuals receiving authorization from the customer. The data of limited access can be defined by a multiple of variables such as user sets or base content filter. For example, a company may provide limited access to specific data to outside legal counsel via a corporate extranet.

B. Tagging

In one embodiment, the ability to "tag" data with one or multiple keywords can be used to enable easier management of archived data. For example, the present invention allows customers to apply tags to messages at several different points of the messages' lifecycle. Tags can be applied at time of import based on a set of predefined filters. This type of tagging allows customers to apply tags to a message so that the message can be identified in the future with the filters that applied to filters at time of import even if the customer's filters otherwise change over time. For example, a customer may initially tag messages based on distribution list of all executives in a company subject to a regulation. At a later point in time, one or more of those executives may no longer be subject to same regulation because of a change in duties, for example. In such cases, the present invention allows a customer to limit searching to messages of an executive that were created during the time the executive was subject to the regulation.

In another embodiment, the present invention includes a set of optional predefined "tagging" policies for standard groupings such as all server topology items, user sets, and distribution lists gathered from synchronization process. In another embodiment, a second type of tag can be applied to messages during searches within the context a project. For example, a customer might create a project for the discovery data in a specific lawsuit. The customer would first define the search query that would retrieve and tag, with a project specific tag, all data subject to disclosure in the lawsuit. Next, the customer could review all the data and add additional tags to further divide the project data set into separate or overlapping groups such privileged data, irrelevant data, or extremely relevant data.

C. Filtering

In one embodiment, the present invention includes a set of filters for data searching and presentation. For example, the set of filters can be used for:

Searching using "Policy" to display only messages affected by a particular policy;
Search "Results Review" to display messages with a view of time;
Capability to exclude specific messages from an export operation;
Capability to mark a message as privileged;
Once a filter is established, the ability to tag an individual message or tag all messages in a search result;
To save all messages into a project which can be re-opened;
To create a "Policy for Review" via Lexical Filters; or
Canned filters based on industry standards or common user policies.

D. Workflow Queues

In one embodiment, a workflow queue can be defined across a set of archive data. Examples of the application of this capability include:

Review queues for internal or external review;
Review based on a random statistical sampling policy;
Review based on keyword or pattern matching policies review based on pre-canned industry policies such as the Health Insurance Portability and Accountability Act (HIPPA) or the Gramm Leach Bliley Act (ELBA); and
Ability for reviewers to mark, comment, escalate, or move a message to a different queue export
In another embodiment, the present invention provides a granular privilege model governing the exporting of messages from an archive. The granular privilege model can determine whether a user is allowed to perform operations on data such as exporting, viewing, and printing. The granular privilege model can also determine acceptable data formats and limit the ability to generate certain document formats or transfer data back to specific environments, such as the client environment.

E. Auditing

In one embodiment, the present invention provides auditing features to assist an organization and its email administrators in proving compliance with internal or external policies. Some parts of the archive auditing may include:

Full record keeping of mail collected by the archive;
Any omissions of data from the archive, and the digital signature of authorized personnel that they were made aware of the omission;
Any email purged from the archive, and the digital signature of the authorized personnel who approved the deletion of the email; and
Statistics around total email collected over periods of time, and statistics around the amount of email currently stored in the archive with an aging profile.

F. Message matching algorithm

In one embodiment, the present invention provides for message matching across multiple environments. Matching can be used in connection with the identification of multiple copies of data for the purpose of reducing the number of copies in connection with the stubbing procedure. One of the challenges overcome by the present invention is the need to correlate messages across multiple environments without relying on any one mechanism. For example, in one implementation, the mail server key and the total content hash can both be used to sufficiently match messages from a particular source (in combination with the header key), but in order to match messages across multiple environments, the present invention relies on the content part hash subset match (in combination with the header key).

In another embodiment, the present invention optimizes the message match process to consider all messages that match the header key and then attempts to match based on mail server key and total content hash. If there is no sufficient match found, the present invention then applies the content part hash subset match to any messages that were not eliminated. This embodiment is particularly valuable in situations in which computing the md5 hash for all text in the message parts is expensive.

(1) Formulating a Header Key. One difficulty in choosing header elements to include in the header key is that mail servers may fill these fields in inconsistent ways or potentially not populate certain headers at all. The present invention avoids such problems by, in one embodiment, using the unique smtp message identification provided by the sending mail server for each message and that message's sent date. In some limited cases, this information can be insufficient to distinguish messages if, for example, the sending mail server fails to correctly create a new message id for each message or does not increment the sent date with sufficient granularity. It is also possible for messages to be sent from a compromised mail server that intentionally sends mail with duplicate message ids and sent dates. To prevent false matches in these scenarios, the matching engine considers a header key match a necessary condition for a full match, but insufficient in and of itself. Because the present invention operates across multiple environments, the matching engine also carefully maintains time zone information in order to coordinate matches between the client environment, the mail server environment, and the managed service environment.

(2) Mail Server Key. In one embodiment, the mail server key is a key that the mail server guarantees is a unique identifier for a message and can be shared within the mail server and managed service environment. In this embodiment, the mail server key is formulated by the mail server environment in which the message resides, as opposed to the sending mail server as described in the case of the smtp message id above. In this embodiment, the mail server key is sufficient for a match in combination with a header key and the present invention always include this key with any message that originates from the harvester service (stubbing or import).

(3) Total Content Hash. In one embodiment, the total content hash is an md5 hash of the entire content of a message. In this embodiment, the total content hash is sufficient for match when combined with a header key and when the source of both messages being considered for match is the event sink capture mechanism. Due to the inconsistent ways that messages are recomposed from their exchange representation into mime messages, the total content hash is not used as a comparison mechanism when messages are compared that originate from the harvester service.

(4) Content Part Hash Subset. In one embodiment, the content part hash set is the set of md5 hashes for parts of a message, such as the body and all its attachments. In this embodiment, the matching engine does not include html parts in the hash set for messages that originate from the harvester service due to the inconsistent ways that html parts are recomposed from their exchange representation. Instead, the matching engine only computes the hash for the plain text versions of these html parts. However, the present invention does store all parts when computing the hash set for a message that originated from the event sink capture mechanism. Thus, when the matching engine considers part hash sets for matching, it only requires a subset match. The header key match and a part hash subset match are a sufficient match for messages regardless of their origin.

One advantage of matching engine of the present invention is that it provides customers the ability to choose whether certain subsets of the match are sufficient for a match with their data and mail server environment, client environment managed service environment. For example, customers have the option of applying stricter match requirement by increasing the information that is required for a true match. The matching engine can also augment the precision of the subset match while preserving managed service environment compatibility with previously deployed customers that use smaller subsets. The matching engine can also allow customer to select special purpose matches that can be more efficient. For example, the matching engine can require that storage management of attachments match only on the attachment hashes, ignoring the text body of the message entirely.

IV. Integrated Policy Engine for Message Management

The present invention provides for many policies that may govern different aspects of managing a message. In various embodiments, for example, policies can determine when a message should be deleted, how long a message must be retained, where a message must be stored, who may view the message, how and where redundant copies of the message are stored. In one embodiment, the present invention uses an integrated policy engine that is specifically designed for the needs of email in order to manage as few copies of messages as possible. In this embodiment, the policy engine manages the varying policies of the present invention in a single, integrated structure.

The policy engine implements polices across the multiple environments in order to govern how messages are handled. The policies implemented by the policy engine help decide the criteria with which messages are retained and deleted, including the determination of the purge mechanism for deletion and the timing for deletion. The policies engine provides customers the flexibility to establish individual polices that can accommodate a variety of factors such as the desired storage environment or environments, different types of data, variable retention periods and requirements of different legal jurisdictions, and the type of storage (indexed, WORM, redundantly stored).

The following are example archiving, continuity, and recovery problems that are solved by the policy engine of the present invention across multiple environments:

A user works in a sensitive group, such as the legal department, for a short period of time. Email from that time period needs to be retained for 3 years. Emails for other time periods require one year's retention.

A customer has no retention requirements for continuity or archiving, but the customer has a stubbing policy. Email needs to be retained for messages that are stubbed on the customer's mail server.

Retroactive policy changes. An administrator changes a retention policy for all email for a group of users (including historical email) from 2 years to 3 years of retention. Email previously stored with 2 years retention should now be stored with three.

Non-retroactive policy changes. An administrator decides that new emails for a group of users need to be retained for 3 years instead of 2 years. A new policy is created and the users are moved into that policy. Old email is still retained for two years under the old policy. New email is stored for three years.

Freeze Purge. A reviewer perfoufis a search. Based on the search results, the reviewer wants to force retention of the messages in the results for an extended period.

An administrator desires to run a report on a user or group of users to find out what retention policies are in effect for that user.

Distribution lists and groups need to be constantly updated so that new members are dynamically added to a retention policy and/or a continuity policy. Members removed from a group should also be dynamically removed from the policy.

In the event that policy membership change silently, the policy engine provides other means of notification to the customer beyond warning screens during policy membership changes in order to prevent errors and increase security.

A. Policies

The policy engine of the present invention enforces the storage, transfer, visibility, and other aspects of messages across the multiple environments. The following is an overview of the characteristics of the policies implemented by the policy engine of the present invention in various embodiments.

(1) The policies determine a broad set of behaviors:

For email that flows through the system, which should we archive?

For email that we've already archived, when should we delete them?

(2) The policies model a variety of email management requirements:

"Keep email sent to John, Paul, George, and Ringo for 30 days."

"Keep email sent from any of our stock brokers for 2 years."

"Keep email sent to our patient records department for no more than 120 days."

"Keep email we've received from servers in China for 90 days."

"Keep email that contains the stock ticker symbol VICEX forever."

(3) The policies are generally comprised of several components:

SCOPE: What messages does this policy apply to?

TAGGABILITY: As messages flow through the system, should we annotate them with this policy?

DELETION BEHAVIOR: When should we delete mail this policy cares about?

CUSTOM ATTRIBUTES: Are there any other custom properties of this policy that may be useful?

(4) The policies can be customized to better address various business situations:

The policies are used as a means to enforce a system administration objective. They are used to prevent deletion of important data, used to ensure that data is purged from an environment to free up space for newer data, or used to enforce that certain messages are removed from the archive in a timely fashion.

The policies can be used as a failsafe mechanism to prevent data from being lost. For example, retention policies will protect a user against deletion of data that may be important to a longer-term business objective.

The policies can be used a means to organize data and help decide who has access to that data. For example, one policy can be used to tag incoming data and then allow reviewers to search data that has been tagged.

The policies can have priorities to allow for a precedence order to be enforced. For example, a low priority policy to aggressively purge data from the system can be overridden by higher priority policies that prevent data from being deleted.

The policies can be dynamically updated with any edits to the membership of group.

B. Policy Scope

The scope of the policies of the present invention generally determine to which messages a specific policy should apply. In one embodiment, a customer may customize the scope of the policies. Importantly, the scope of the polices of the present invention does not have to be limited to particular message properties, such as senders, recipients, headers, and body text. Instead, the scope of the policies of the present invention can be based on factors that are completely external to messages, such as the current time. Consequently, the policies of the current invention are more powerful than traditional classification systems that are based solely on message properties. The following is an illustrative list of example policy scopes that may be customized by a customer:

Sender—for example "all messages sent to 'George'"

Recipients—for example "all messages received by 'George'"

Other Message Header Properties, including contents of the subject—for example "all messages with a subject that contains the word 'banana'"

Timestamps of the Message—for example "all messages received during the final month of a financial quarter"

Membership of the Sender or Recipients—for example "all messages sent to members of the mailing list 'Administrators'"

Contents of the Body of the Email—for example "all messages that contains the word 'banana'"

Classification of Email (Internal/External), Confidential, Sensitive, etc.—for example "all messages flagged as 'confidential' or 'sensitive'"

Originating Mail Server—for example "all messages sent via the email server in a company's London office"

Originating Mail Server Location—for example "all messages sent from Korea"

Tags or Metadata added by other systems, including the primary mail system, email gateways, or other policy engines—for example "all messages that we consider spam"

C. Tag-Ability

In one embodiment, the policies of the present invention are message-based polices that "tag" messages with the name of applicable policies. For example, if a policy called "Brokers" that has a scope of "all users in the 'Brokers' mailing list", the customer could elect to designate that policy as "tag-able". If the policy was designated as tag-able, the present invention would stamp messages with the "Brokers" policy that meet the scope of that policy when the message first enters into one of the environments. The present invention would also stamp the message with any other applicable, tag-able policies. In one embodiment, the policy engine can also determine which emails have been stamped with any particular tag and which policies are stamped upon any particular message or groups of messages. For example, the present invention can very easily allow a select group of users, such as a group of lawyers, view any messages that have been tagged with a particular policy, regardless of where the messages are stored across the multiple environments. In another example, the present invention easily allows a customer to encrypt all messages that have been tagged with a "confidential" policy. In yet another example, a customer can specify that messages tagged with a particular policy, such as "Stock Broker Compliance", should be kept for 7 years, even if the people that sent those messages have left the company or are no longer stock brokers.

D. Visibility Policies

In one embodiment of the present invention, customers can limit a user's access to historical messages even though a policy may specify a longer retention period for the messages. For example, the policy engine could implement policies that remove a user's ability to view certain historic messages, preserves viewing rights for a specific amount of time or preserves viewing rights for a specific period of time.

E. Deletion Behavior

As described in more detail below, in one embodiment of the present invention, a customer can specify policies that control how and when groups of messages are deleted.

F. Types of Policies

In one embodiment, the present invention uses the customizability of the policy system to implement several specific, specialized policies: retention policies, stubbing policies, legal hold policies, and catch-all policies.

(1) Retention Policies

A retention policy is a specialized policy that indicates which data should be archived and for how long. In one embodiment, retention policies employ custom attributes to store the number of days that matching email should be kept. Examples of retention policies in various embodiment of the present invention include:

"Keep email sent to Karen for 7 years."

"Keep email containing the word 'Confidential' in the subject for only 5 days."

"Keep email sent to everyone in the company for 30 days."

In another embodiment, retention policies use custom attributes to store priority infonnation to allow for the resolution of conflicts between multiple retention policies that apply to the same message. The priorities of retention policies do not have to correspond to the policies' respective retention periods. For example, a customer may specify that a policy with a short retention period take precedence over one that is longer.

In another embodiment, retention policies allow the customer to specify whether a specific retention policy is "tag-able" or not. For example, the customer can match messages stamped at capture-time so that, even if policy membership changes in the future, tagged messages are kept the correct amount of time.

In another embodiment, customers may prefer that retention follows a user instead of the message. For example, if a user moves from policy A to policy B, then policy B is what applies to that user's mail. This is a case where the user would NOT want the policy to "tag" incoming mail. For example, if a compliance policy was applied to a Broker ("Bob") and Bob changed roles to being a mail clerk, the email collected while Bob was a Broker should still reflect the Broker policy. New email for Bob should be under the mail clerk policy.

In another embodiment, the deletion behavior of a retention policy specifics that, for a given message, it should retained for as long as the highest priority applicable policy dictates. Deletion behavior can be further customized to handle situations where members of a retention policy no longer exist in the user's email system. In another embodiment, the present invention allows a customer to specify a special temporary policy for situations such as when a user is removed from primary email system. If the retention policies governing the messages are based on message attributes rather other than the identity of the user then termination of the user would not be expected to initiate a purge. On the other hand, if the retention policy is user-based, then termination of the user could remove that user's messages from control of the policy and subject the messages to a purge. For example, for compliance, a broker's email must be kept for X years even thought the broker left the organization. In another example, a company might want to retain records in order to search a former employee's historical message in the event of a post-termination lawsuit. In such cases, the present invention provides the customer a notification that the terminated user's messages are no longer governed by a policy and may be subject to a purge unless the administrator implements a special temporary policy within a specified time period.

(2) Legal Hold Policies

In one embodiment, the present invention implements a legal hold policy with a specialized deletion behavior that indicates that messages subject to the policy should not be deleted until the policy is discontinued.

(3) Stubbing Policies

In one embodiment, the present invention replaces message content, also referred to herein as "stubbing" the message, with a reference to the content stored in the email archive. In this embodiment, stubbing policies specify which emails are eligible for stubbing by service. The customer may also specify or customize the scope of a stubbing policy. Example stubbing policies in various embodiment of the present invention include:

Stub email for a set of specific users.
Stub email for users in a given mailing list.
Stub email containing particular words.
Stub only the attachments of an email.
Stub only the message content.
Staleness threshold—A staleness threshold indicates that when messages reach a certain age (e.g. 90 days old), it will be replaced with a stub.
Attachment size threshold—The attachment size threshold indicates that if a message attachment is bigger than a certain size, it will be replaced with a stub.
Inline size threshold—The inline threshold indicates that if a message body is bigger than a certain size, it is replaced with a stub.
Customized deletion behavior—any messages that any stubbing policies apply to should be kept indefinitely unless the message has been explicitly un-stubbed by an administrator.

(4) "Catch-All" Policy

In one embodiment, a customer may specify a special catch-all policy that indicates what the default behavior is for all captured email. The catch-all policy is a default policy that allows all other policies to override the catch-all policy's specifications. A customer can use a c—atch-all policy to specify, for example, that messages should only be kept for 30 days if no other policies apply to the messages. In this way, the catch-all policy acts as a safety net, guarding against premature deletion of information.

G. Purge

The present invention allows customers to define multiple policies, and several policies of varying type may apply to the same message. In one embodiment, to resolve conflicts between multiple policies, the present invention uses a vote-based arbitration system. In this embodiment, policies can cast "votes" indicating whether or not a particular message should be removed from the archive. Each vote has a weight, which states the relative importance of that vote relative to others. An aggregation process collects the votes and their weights from each policy that applies to each message, and sends them to an arbitration system. A customer may also customize the arbitration system. Example customizations of the arbitration system in various embodiment of the present invention include:

"The highest-weighted vote for each message determines that message's fate."

"We will only remove a message from the archive if 3 different rules vote to delete it."

"Votes to keep a message will veto those that request it be deleted."

Similar to how policies can be constructed to retain email based on criteria that may change, such as distribution list membership, the decision to purge email may also be based on dynamic criteria. However, the dynamic criteria of a retention policy are not necessarily linked to the dynamic criteria for purging messages. For example, messages may be retained based on dynamic criteria, but purged at a fixed time even if the retention criteria change. Alternatively, messages may be retained based on dynamic criteria, but purged when the criteria changes. Consequently, the arbitration system is a powerful tool of the present invention because it provides a clean separation of the decision to retain and the decision to purge.

V. Synchronization of Metadata

In one embodiment, the present invention allows a customer to automatically identify a system of records in any environment. In addition, a customer may perform a one-way or two-way synchronizing of data between environments to provide the customer with a greater understanding of the systems of record. The customer can also customize a synchronization schedule such as a periodic basis like nightly or hourly, a real-time basis, or a one-time basis.

Utilizing servers within the mail server environment, such as an enterprise software component, the present invention has unique ability to gather metadata from the mail server environment and the client environment that would not be accessible to an existing managed service solution. For example, the present invention can automatically identify available data for synchronization and report its findings to the managed service environment. An administrator can then choose which attributes should be collected and which services should use them. During the next synchronization, the mail server environment will query the managed service environment for the attributes that it should synchronize back to the managed service environment.

Examples of Metadata Synchronization:

Example metadata synchronization in various embodiment of the present invention include:

Synchronizing Architecture Topology—Synchronizes the number, names, types, and configuration of servers in the mail server environment or client environment and then sends results to the managed service environment so that functions requiring greater understanding of the mail server environment or client environment may be performed.

Synchronizing Wireless Device Information—Synchronizes the number, identifiers, type, owner, policies, and other configuration information for wireless devices. This information may be synchronized directly from the email servers, enterprise directory systems, or wireless software servers, each in the mail server environment.

Synchronizing Telephony Information Stored in the Mail Server—Synchronizes information stored in the email server that may be beneficial for use in the managed service environment. This information could include phone number to mailbox mapping information, user names, and other configuration information that could be used in the managed service environment to provide continuity of operation, or provide other services, in the event of an outage in the mail server environment.

Synchronizing Mailbox Information—Synchronizes contents of mailboxes in the client environment and provides the results to the managed service environment. This information can include information such as folder structures, messages, last modified time of messages, and other messages attributes. Additional information about user policies such as delegates, out of office message, signatures, and server side rules. This information may be sent to the managed service environment.

Synchronizing Presences "Instant Messaging" Information—Synchronizes users instant messaging or presence data in the client environment and provides them to the managed service environment. This information can include information such as user public instant messaging network accounts (Yahoo, AOL, Jabber, MSN, etc.) and corporate private address. This information may be sent to the managed service environment.

A. Real-Time Proxies

A common challenge for existing managed service solutions is the ability to extract or interact with the mail server environment and client environment because these environments are inside a customer's secure firewall. Existing managed service solutions require customers to open ports and loosen security to enable the existing managed service solutions to communicate to software or systems inside the customer's firewall. In one embodiment, however, the present invention allows communication between the managed service environment and the mail server environment and the client environment without requiring changes to the customer's network environment. In one embodiment, this inter-environment communication is accomplished by using behind the firewall components to periodically poll the services outside the firewall to determine if messages, actions, or other events are queued for the systems inside the firewall.

B. Safety Net for Periodic Synchronization

One problem that arises with data synchronization across multiple environments is determining the frequency of the data synchronization process in order to avoid losing functionality for other processes that relies on the data undergoing synchronization. The optimal solution would to perform real-time synchronization but this solution is not typically feasible because of the resources it consumes. In one embodiment, the present invention addresses the potential changes that happen between synchronization by placing all or some portion of the data into a holding bin that can be quickly revaluated after the next synchronization. Depending on the type of data being evaluated, the present invention might only choose to reevaluate certain data if it meets certain criteria. Two examples include:

Recipient Verification—A common method of filtering email for spam is to use recipient verification where an email sent to unknown user is rejected. When conducted at the mail server environment or the client environment, a recipient verification filter can base decisions on real-time list of users. When a recipient verification filter is conducted in the managed service environment, however, it typically must rely on a dated list of users. In one embodiment, the present invention provides several permutations of zero hour synchronization that can be applied in this situation. For example, a customer can choose to say don't reject users that existed in previous synchronization (user deleted in last sync) because they might have accidentally been deleted and to put them in holding quarantine where they can be revaluated after next synchronization, and then deleted if still is invalid user. A customer can also choose not to reject any email because of invalid users and, instead, put invalid users into quarantine for revaluation after next synchronization to avoid rejecting a user that might have been added since last synchronization.

User Based Archive Policies—When archive retention policies are determined by user group membership and due to an administrative error they fall out of the policy because they were either deleted or removed from group there can be a "safety net" by putting them into a temporary or holding policy that continues to keep mail for this user until the next sync, multiple synchronization and/or minimum set period of time. After this period has occurred the data in question can be revaluated with new rules.

C. Hybrid Real-Time and Periodic Synchronization

The necessary synchronization frequency varies from a real-time frequency to infrequent frequency depending on factors such as the class or type of data and synchronizing event. In one embodiment, the present invention provides multiple types of synchronization, allowing for classification of events and triggering synchronization of specific data. A synchronization policy can also be used to determine when synchronization occurs for the specific data. For example, the policy may immediately synchronize the deletion of a user from the primary system to the archiving service to assure that a deleted user can no longer log in. In another example, the policy may synchronize new user accounts only on a nightly basis since new users do not receive much email their first day.

D. Server-Integrated Personal Safe Lists

Companies filtering email for unwanted content such as spam face a decision between being more aggressive in detecting email as spam and risk classifying an email incorrectly as spam, a false-positive, or being less aggressive and letting more spam through. A commonly known means to allow users to prevent false positives is to let each user manage their own safe list in the client environment or in the mail server environment. However, this approach typically requires each user to individually enter every address they want to safe list or individually initiate uploads of the information to keep it current. In one embodiment, the present invention will automatically synchronize contact data created by users in the client environment to augment personal safe lists used in the anti-spam filtering process. The synchronization technology of the present invention allows for data to be gathered from sources beyond just Lightweight Directory Access Protocol (LDAP) directories in the client environment and it can synchronize the user contact data to the managed service environment. Storage of the contact information in the managed service environment provides complete protection against "false positive" identification for these known contacts. A customer can enable this safe list synchronization feature on a per user basis or delegate the enablement decision to users.

E. Attribute Based Dynamic Groups

In one embodiment, the present invention utilizes the information synchronized from the client environment to provide the ability to define "groups" based on attributes associated with users. In one example, the groups are created from multiple attributes providing for a hierarchal representation of users. The groups can then be used to apply rules such as security policies, archiving retention, compliance rules, notifications. For example, a user might have the attributes of "Building" and "Floor". The present invention can also define groups to be a set of nested groups initially made, for example, for users in a building and then expanded to a more granular selection of users on a floor of the building.

F. Extension of Server Policies to the Perimeter

In one embodiment, the present invention automatically synchronizes polices in the mail server environment and, later, extends the synchronization to the managed service environment. For example, an "Ethical Wall" policy specified in the mail server environment that prevents two groups from mailing each other may be synchronized first and, subsequently, the present invention would apply same rules in the managed service environment to address for instance, a backup mail system and production mail flow.

G. Least Cost Routing Dynamic MX Records Service (LCR MX)

Messaging systems need to work in a highly efficient manner since messaging is such a core component of the corporate communication network used to communicate with users, partners, and other external entities. However, the costs associated with maintaining a highly efficient messaging system can be significant. In one embodiment, the present invention leverages topology information across multiple environments about servers, connectors, network links, mailboxes, etc in order to automatically route email to the ideal SMTP gateway for email security users. This feature is further designed to efficiently route email to the preferred mail server on a per recipient basis. In one example, the present invention may utilize a Heterogeneous Multiple-Organization Mail Environment operating under a single domain. In another example, the present invention may utilize a priority queuing and routing approach. The present invention can further reduce loads and bandwidth requirements by perfoiiiiing recipient verification to determine if email is destined to non-existent users and, if so, rejecting the email before it is sent to the client environment. In this manner, the present invention further reduces the total connection volume necessary to support the client environment. The present invention can also implement virus scans or spam detections in connection with performing this type of routing in order to further reduce impacts to the client environment. In these embodiments, the present invention allows the mail server environment to deliver email in the most efficient manner possible and provides dynamic routing solutions that accommodate the growth of organizations and the migration of users' mailboxes within the client environment.

One critical advantage of one embodiment of the present invention lies in the automated nature of calculating the least cost routing (LCR) MX record external to the mail server environment and the client environment. In one embodiment, the present invention uses knowledge of internal email server topology to determine least cost routing to the gateways closest to users mailbox. Example implements of such least cost routing includes:

Analyze internal topology to express "weights" of connections between servers. In a simple example, the present invention sends to gateways in the same routing group, or a first level approximation. For example, if a customer has two routing groups and an Internet gateway in each, the present invention can route mail to the right gateway because it knows the user's routing groups. In a more complex case, the present invention looks for a gateway with cheapest cost to user's routing group and for how the groups are connected.

Define connectors. The customer can specify the server that acts as the bridgehead for the connector and all mail will route through the connector.

VI. Desktop Client Components for Multiple Environments

A. Authentication

Companies are often reluctant to deploy any components that require their end users to learn a new password. For example, when an end user logs into an application outside of client environment through an interface such as a web browser, the end user will typically have a password that is separately managed by that application. This is suboptimal from user perspective because the user typically has to use a different password that may be subject to different complexity requirements. As discussed above, one embodiment of the present invention provides the ability to proxy passwords requests to an internal server that can authenticate users without exporting password information outside of the client environment or the mail server environment.

In situations where the client environment involves multiple components and types of components, it is even more important to provide users with a seamless user experience. For example, in one embodiment, the present invention uses the user's client environment password (e.g. Windows password) first looks at a user's client environment log in credentials and then correlates with information stored in the managed service environment that does not rely on hand entered passwords and is at least as secure of corporate standards. For example, the following is an example implementation involving Microsoft Outlook/Exchange:

Outlook Extension authenticates with service using a per-user authentication token, which is just a long (>128 bit) random number. The number is computed using keyed MD5 hash combined with user id. Outlook Extension will store the token in user's registry hive encrypted using Data Protection API.

The extension can obtain the token in 2 ways:

By reading a hidden message in the user's mailbox. User administrator can run a tool to write authentication token into users' Exchange mailboxes. The token is stored in hidden message in associated contents of the IPM_SUBTREE folder. The extension reads token from the mailbox if it can't find the token in the registry or cached token is invalid.

If authentication was not provisioned a manual fall back method if provided through a manual password prompt using the user service account password at startup. This can happen if the extension can't read the token from the mailbox (for instance during emergency installs).

Additionally, in one embodiment, the present invention provides users with a seamless interaction with all of its functions. This seamless interaction includes functions that are external to the client environment where, for example, a user might launch a web browser to allow the user to perform functions that are not directly available within the client environment. The external component can transfer any data related to the user's functions and provide authentication with a single log in so that the user does not have to reenter credentials. In another embodiment, the present invention may require additional credentials if the customer needs certain functionality or privileged tasks to be more tightly secured.

B. Dynamically Deploy Features from the Managed Service Environment

In one embodiment, an administrator can control which features an end user can access via the client environment. The features can be enabled and disabled remotely and independently of what users are allowed to do on another interface. For example, an Outlook extension providing continuity, security, and archive search can be deployed to the client environment and made available to end users. An administrator can also disable access to a feature, even if that feature is available in the mail server environment. For instance, an administrator can disable an archive search feature from Outlook, but still allow users to search through the managed service environment. The extension will periodically query the managed service environment or push information to find out what features a user may enable. The push may occur by sending email with an encoded message that the extension intercepts and interprets. To troubleshoot problems, the end user can send log files from the client environment (e.g. Outlook extension) to managed service environment:

(1) Seamless Email Client Failover

The present invention uniquely describes a client environment that is capable of intelligently connecting to either a mail server environment or to a managed service environment to restore email operations. In one embodiment, for example, the client environment may periodically connect to both the mail server environment and the managed service environment to retrieve messages. It may also send messages to the managed service environment based on inability to connect to the mail server environment. The client environment may periodically poll the managed service environment to determine when it should connect to the managed service environment rather than the mail server environment. The present invention may employ the a seamless failover between the mail server environment and the managed service environment, regardless of whether the end users are using Outlook, BlackBerry, or another method for accessing the client environment.

One advantage of the present invention is that it allows users to perform critical email functions through their primary email interface in the client environment even while an email backup system is engaged. Below is a list of four such features in various embodiments of the present invention:

Seamless End User Experience. Users do not need to modify their behavior in order to continue to send and receive email when backup email system is active.

Automated, Scalable Setup Process,

Security. All emails sent/received by the client continue to be encrypted using similar encryption protocols to Exchange Agents. Agents can be easily deployed, setup, and remotely activated giving the users a truly seamless experience. The agent will allow Outlook to detect when a user has been activated and allow for a separate sending and delivery mechanism for email. In one embodiment, an agent running in mail server environment may also provide for dynamic failover between a primary mail server in the mail server environment and a backup mail system in the managed service environment. For example, the present invention can deploy a software engine, such as an Outlook "plug-in" or "extension", that resides in the client environment. The software engine can send and retrieve messages from the managed service environment if the primary system is unavailable. The DNS may be redirected to a MAPI provider and monitoring and notification can be based on certain email delivery events, such as queuing. In addition, this embodiment may also employ a disaster recovery folder in Outlook or an AlertFind portal.

(2) Continuity State Machine

In one embodiment, the agent has three modes: active, recovery, and ready. The agent may use Outlook extension to transfer messages between mail server environment and the managed service environment. The agent will track the state of the user on the managed service environment and, when active, will insert mail from the managed service environment into user's Inbox in the client environment and transfer sent items from the mail server environment to the managed service environment.

Ready Mode. Make an outbound "heartbeat" to the managed service environment to receive configuration, client software version, etc. Remotely configure and manage plug-in (kill from backend, gather logs, etc.).

Activation Mode.

Messages can be sent/received via Outlook during activation.

User must be able to work from remote location.

All email will appear to have come through the exchange account.

All email will be delivered to their Inbox.

Messages are properly routed to Active Mailbox (archive).

Messages sent from Outlook between Exchange failure and before activation are automatically sent once activated.

User should not receive warnings or error messages alerting them to the fact that Outlook can't connect to exchange.

Ability to edit personal contacts.

Ability to schedule meetings.

Email rules will be obeyed.

Recovery Mode. Once the activation mode has ended, the message infoiination is synchronized. In recovery mode, the agent can reconcile messages not synchronized between the client environment and the mail server environment. The agent may also restore messages that were assumed to be recovered to the mail server environment by the client environment but encountered problems. This reconciliation requires the recovery process to be able to check for duplicates without creating second copies of messages already recovered through another method. For example, the reconciliation may run on a mailbox-by-mailbox basis, for example, for an employee who complains about some messages being lost after an activation of the backup email system in the managed service environment. Customers will typically, but are not obligated to, deploy the agent as part of the normal rollout deployment process in advance of any activation of the present invention. Advantages of the agent include:

Manages the deployment process from the managed service environment;
Installs the Outlook plug-in files on the client environment;
Minimizes user interaction;
Ability to do phased deployment;
Option to silently install plug-in preconfigured for user;
Remotely configures and manages plug-ins (kill from managed service environment, gather logs, etc.); and
Setup does not require the customer to manually setup an additional accounts or profiles.

(3) Seamless Email Client Continuity

The present invention allows the mail server environment to failover to the managed service environment in a manner that is seamless to the end user of the client environment. In one embodiment, the agent operating within the client environment will seamlessly begin sending and receiving email from a backup email system hosted in the managed service environment. This seamless transition makes it possible for employees to continue to use their normal email interface in the client environment, even when the mail server environment is not available. The software periodically checks the backup system to determine whether it is active and, if so, sends messages through the backup system until the mail server environment is again functional. The following is an example implementation of one embodiment of the present invention:

Outlook Extension communicates with the managed service environment or the mail server environment using a web service.
The extension periodically polls the managed service environment for status info. A suggested default period is 5 minutes with an override ability. Managed service environment serves each user's status info as a static page. Outlook Extension receives state URL as part of the initialization request at Outlook startup.
The request for new mail indicator URL returns a page with a 64-bit number that increases when new mail appears. The client does not need to interpret the return value, other than looking for increases in the returned number. An HTTP response code of "404 Not Found" indicates that the user is in the ready or recovery state and client cannot retrieve any more mail.
Upon activation, Outlook will be forced into an offline mode. Users attempting to switch to Online mode will be automatically switched back and a message will be displayed. If the administrator chooses to notify users during the activation, a dialog will pop up (in addition to the delivery of the normal activation email/SMS) to notify users that they have been switched over and that not all Outlook operations will still be available.
During activation
The Outlook user will use the same email composition and viewing windows as during normal operation.
New messages will appear in the users Inbox.
Sent messages must appear in the users Sent Folders.
Messages will be propagated to Archive if enabled.
Also, calendar entries may be created, distributed, and provide for end users to accept calendar invitations. Free/busy information is typically not available.
Calendar invitations will be sent out, and received. Accepting, declining, etc. will work as normal, so while active on EMS, Activated and Non-Activated users can still create new calendar entries and interact with invitations.
Since Outlook 2003 is operating in cached mode, the user can edit their contacts in the normal fashion, and will be synchronized to the mail server environment when it becomes available.
Outlook and web mail can be synchronized in one embodiment. Once an email has been pulled down by Outlook, Outlook is the master, and web mail would optionally affect the mail forensics provided in recovery. If a user logs into web mail and read or forwarded an email after the email had been pulled down by Outlook, messages that are sent via web mail will be inserted into the Sent Folder in the Outlook client.

Recovery

Recovery uses client synchronization to restore mailboxes back into the mail sever environment.
Messages sent and received during the activation will appear back in the mail server environment after an activation, just like they would during a normal EMS Activation scenario. Recovery will depend on Outlook Cached Mode to synchronize new mail back to Exchange. All other mail will be recovered by Recovery Manager. If any mail is missing, there will be an option to recovery mail delivered to Outlook clients (either as a separate recovery, or in concert with the mail not delivered to an Outlook client), potentially with a folder "recovered mail" as an option. A user using a journal-based archiving system may recover a copy of all mail into the journal archive or use envelope journaling to a managed service environment archive. In one embodiment, the present invention provides an option to recover mail to Exchange from the recovery manager that uses the local cache. Recovered times may be stored in a "EMS recovered items" folder.

Based on customer settings a user can be either inside the corporate firewall with outbound HTTP access (and possibly proxy server) or outside the corporate environment with Internet access, even in a situation where they would not normally have access to the Exchange server in the mail server environment (i.e. not connected via VPN). This is typically expected in a disaster scenario. A user can move back and forth between Outlook and the Web Client during an activation of backup mail services. If a cached set of end user's email is not available in the client environment, there is also an option to create a desktop level cache of mailbox. This option can be set to be any period of time or all the users email. This option can also be the same cache used for offline archive access or local cache of stubs (reduce stubbing response times.) When the agent is pulling down messages, it can also retrieve messages encrypted and compressed and then decrypts and decompress in the client environment, in order to reduce bandwidth consumption.

The following are Outlook Approaches of alternate embodiments of the present invention:

POP/SMTP Email Account—opens up IMAP or POP3 support on the managed service environment and let users configure within the client environment to connect during activation;
Alternate Outlook Profile with PST;
Alternate Outlook Profile with Wrapped PST;
Other Store in Primary Profile;
Inbox in primary profile;
Additional Transport in Primary Profile;

Preview Pane. Web view access via Outlook Folder pointed to website; and

On demand provisioning of new email settings.

(4) Seamless Wireless Email Device Continuity

In one embodiment, the present invention deploys agents that operate on wireless email devices, such as Blackberries, PocketPC, or Windows Mobile. In the event of disruptions to the mail server environment, these agents serve to seamlessly begin sending and receiving email from a backup email system in the managed service environment. The agents ensure that the wireless email device can continue to be operational despite an outage in the mail server environment. The following is an example list of elements for seamless BlackBerry continuity:

Synchronization requirements

Deployment process

Agent Capabilities

Agent Detection/Interception

With BES

Without BES

Syncing key information about blackberry devices from the BES server

Client software on the BlackBerry device to pull messages from backup system and place into inbox—also to intercept failed sent messages and resent through the backup system while active The following are example implementations of various embodiments of the present invention:

EMS-RIM Relay. A service that runs on the managed service environment that takes messages from the backup mailbox and sends them along on their way to the handheld via an alternative route. EMS-RIM also receives messages sent on the handheld while in disaster recovert mode and puts those messages into the backup mailbox. The Relay speaks to the EMS-BES Relay. In one embodiment, the present invention speaks IMAP to EMS in order to provide more functionality and standards-based if such an implementation is justified by the implementation time.

EMS-BES Relay. A service that runs on the BES that co-ordinates information between the EMS-RIM Relay and an agent running on the handheld device. It relays messages from the EMS-RIM to the handheld via the MDS service. In one embodiment, this option is not required if inbound internet connections are not a concern. In this embodiment, the option can be required to periodically poll the managed service environment or hold a persistent connection.

Wireless Agent. A java application (J2ME) that is wirelessly deployed to the handheld device. The application lets the user know they are protected, and when their backup mailbox is activated, it takes over the sending/receiving of email messages. Users continue to use the BlackBerry mail application Previous approach for BlackBerry Devices BlackBerry support today consists of forwarding a copy of each message received in the EMS to the alternate (BWC) address of the device. When users reply to messages forwarded in this manner the end user experience is largely seamless. However, when users compose new messages or reply to older messages received through the BES server there is a significant change in user experience.

Similar Approaches with Other Wireless Devices

In one embodiment, the present invention provides a failover solution for wireless platforms generally that is similar to approach outlined above for BlackBerry devices. These platforms could include any mobile device containing a browser, or messaging synchronization software. Below is an outline of an example implementation:

Standard messaging protocols communicate with the standby messaging service (POP, SMTP, etc);

A web-based user interface (UI) is optimized for use in a wireless browser for messaging;

Web Services calls from the Messaging Device to the standby messaging service;

Notification or Message Push from the standby messaging service to the Messaging Device when supported by the device;

Software relay or proxy components integrate with the mail server environment in order to relay messages between the standby messaging service and the Messaging Device;

User premise software hosted in the managed service environment can communicate with the Messaging Device in the case of a full site outage; and Software imbedded in the Wireless Service Providers service can route or proxy request away from the mail server environment and to the standby messaging service.

C. Email Client Integration for Archive

In one embodiment, the present invention provides a software component operating in the client environment that is can be used to view and access archived content and allows users to seamlessly search archived content in the managed service environment using the software component in the client environment.

D. Search

In one embodiment, the present invention provides a single interface that allows a user to seamlessly search the client environment, the mail server environment, and archived emails in the managed service environment. In addition, the search results can be returned as single search query report. In one embodiment, the present invention (i) employs a plug-in (extension/add-in) to Microsoft Exchanges and Outlook that either creates a new search interface with more advanced options to query multiple environments; (ii) interfaces with Outlook's existing search interface to present the results inside of Outlook; or (iii) launches a separate window that provides search results with more advanced options.

E. Stubbing

In one embodiment, a customer or an end user may control where copies of a message reside in connection stubbed messages. For example, an end user could send a set of messages into the managed service environment for storage, or pull messages from the managed service environment into the mail server environment.

F. Email Client Integration for Communication of Setting to Managed Security Solution In one embodiment, software components operating within the client environment allow direct access to anti-virus or anti-spam settings controlled by the user. These settings change behavior in the managed service environment. In one embodiment involving Outlook, this feature is implemented adding a new tab in the Outlook Options that gives the user a list of settings to set and update locally within the client environment. The settings are then transparently and automatically updated to the managed service environment. Additionally, the present invention integrates common actions of security solutions into the client environment for users to perform. Such actions include (i) selecting a message or set of messages and (ii) creating rules to govern future messages such as the ability to add recipients, senders or domains of recipients or senders of an email message to the user's personal safe list hosted remotely in the managed service environment.

G. "Virtual" Folders in Email Client

In one embodiment, the present invention includes a folder in a user's mailbox hierarchy that takes actions on messages placed in the folder and on messages that only exists as pointers to full messages in archive in the manages service environment. The folder operates as if the messages were located within the client environment and provide functions such as drag and drop to local email sever based folders. The folder may or may not also exist as folder on mail server environment depending on type of policy attached to the folder.

A common way for users to manage their emails is filing their email in a hierarchal structure. With virtual folders can have a set of key words that can be used to classify email on backend archive and allow user to continue to use folder structure to organize email. With the use of pointers the user could put the same message in multiple folders and have it appear in all the folders without duplication of message with use of pointers. Example folders of various embodiments of the present invention include:

- Virtual "Quarantine" Folder. A virtual folder that exists in user mailbox that acts as the user's quarantine of messages that were placed there by a policy such as containing spam or specific content. The emails in the folder can be stored in the managed service environment independent of the mail server environment. The folder can have different permissions that control decisions such as whether a user can view certain messages, just view subject lines or allow the messages to be dragged to the message inbox. The net effect of dragging the messages to the message inbox would be to release the messages from quarantine and to allow the full message to be brought into the mail server environment. Additionally, a user can report spam messages by moving or dropping them into a folder from an inbox folder and the messages would transparently be sent to managed service environment for analysis of spam. The quarantine folder can also use the existing "Junk" folder, if one exists.
- Archive Policy Folders. Folders can be created that allow user to have a specific archive policy applied. Such as stub all email that is placed in that folder.
- Imported PST Folders. When a user's email is imported into the archive of the managed service environment and deleted from the client environment and the mail server environment, the user may still want to access the email in similar manner to how they had previously accessed the email. The present invention can import the email from the managed service environment and create a virtual folder in a user folder in the mail server system that represents a PST file, its folder structure, and contains the messages as virtual pointers.

Users or administrators can also create folders that employ any combination of actions described above.

VII. New User Provisioning for Managed Service Environment

Provisioning of new users or new employees is typically a very painful and expensive process for a company because of having to update information in a variety of disparate systems. The synchronization process described above provides an automated means of creating users as they are added to primary system. In some situations, user information is needed that the synchronization process was not able to gather if, for example, it did not exist at the time of the synchronization. In one example, a continuity system needs to notify a user before activation to request that the user add personal contact points or set options for how their personal email filtering should behave.

At times, users will not respond to administrator requests upon being welcomed. The present invention can identify to the administrator who was welcomed and did not respond, and target a reminder message to be sent to that set of users. There are also situations where the administrator will also want to know if a user has preformed all tasks necessary by the present invention to operate properly. One example is that the administrator may want to know which users did not enter notification information and to send those users a reminder. Additionally, the administrator might want to address tasks that are time sensitive by sending a reminder to users who did perform specific task in past but haven't provided updates in the specified time period. This option could be used to require users to update notification information every six months or just to require users to login to the data management application at least every 6 months. Administrators may also make sure all users respond to messages, track metrics of welcomed users, and mark some users that were auto created but aren't really users, such as resource mailboxes, to be ignored by the welcome process. The process of ignoring a user can be re-enabled at a latter time if necessary. All of these permutations of selecting users to the welcome process can either be executed manually or through scheduled process.

VIII. Remote Monitoring Across Multiple Environments

A challenge of running software across multiple environments is the ability to monitor each environment. The present invention monitors each environment and the storage and transfer mechanisms.

A. Remote Monitoring of Messaging Transfer, Storage, and Systems Across Multiple Environments A large challenge for complex mail server environments and complex client environments is tracking the lifecycle of messages. Management of email services across environments may include the following:

- Flow of email across multiple environments;
- Where messages are stored (potentially multiple locations);
- What policies have or have not been applied to a message;
- When a message was purged and for what purpose; and
- Audit trails of actions taken on messages, transfer receipts, etc.

B. Storage

Display Storage Total for the user—Administrators need to be able to estimate how much storage they are using for billing purposes.

C. Transfer

Monitoring and notification based on certain email delivery events (i.e. queuing). Process to monitor outbound mail queues used for content filtering for downstream user email deliver issues. This includes monitoring mail logs for issues with RBLs in order to reduce likelihood that servers relaying email will be blocked. For example:

- Up or down, queue size;
- Oldest message in the VaultBox;
- SFTP connection state such as number of threads connected and time of last message sent; and
- State of the SMTP service.

IX. DR Folder for Messages or Documents

In one embodiment, the present invention allows users to store messages in a special "folder" with special properties such as high availability of the data. For example, email messages may be stored in an email folder and documents may be stored in a file folder. These critical documents and emails are made available in the event of a disaster recovery or business continuity situation. Possible implementations include presentation within the email client or within a web-based portal.

X. Voice Continuity

In one embodiment, the present invention restoration of voice messaging capabilities on a backup system in the event of a planned or unplanned outage. For example, a backup email or other messaging system in the managed service environment can serve as the failover system for voice messaging. By synchronizing information pertaining to voice communications from the mail server environment as well as from the company phone system, the backup system may be used to provide continuity of voice communication, including the sending and receiving of calls from the same phone number and the continuing ability to receive voicemail messages. In one embodiment, these telephony capabilities (such as checking voice messages and placing calls) may be made available within the client environment in the form of an email client, computer desktop, or web portal.

XI. Failover to either local or remote backup system

In one embodiment, the present invention allows administrators to choose between executing a failover to a local cluster (such as Microsoft Live Communication Server) in the mail server environment or to a backup system in the managed service environment based on the conditions from a single hosted console. This embodiment allows an administrator to choose between executing a failover for an individual mail server (or set of mailboxes on that server) to different options: 1) an email continuity service in the managed service environment, 2) a local native mail system mail server environment, or 3) a native Exchange system in the managed service environment. The present invention provides administrators with a user interface where they can choose the method of failover based on the type of outage experienced or maintenance required. Then, the failover method is executed in an automated fashion such that the administrator does not have to manually intervene to complete the process. This approach to failover can also apply to messaging dependent servers, such as those that relay messages to wireless devices, provide document management of messages, or archive messages.

With reference now to FIG. 1, a diagram illustrating the managed service environment, the mail server environment and the client environment in one embodiment of the present invention is shown. The managed service environment 101, the mail server environment 102, the client environment 103, and a data management application comprise one embodiment of the present invention. The data management application manages data across managed service environment 101, the mail server environment 102, and the client environment 103 so that data is managed across 105 the managed service environment 101 and the mail server environment 102, across 104 the managed service environment 101 and the client environment 103 and across 106 the mail server environment 102 and the client environment 103. The managed service environment 101 may consist of one or more storage devices operated or maintained by a service provider. For, example, the managed service environment 101 may include data centers that are located at location operated by a service provider. The mail server environment 102 may consist of one or more storage devices operating in proximity to a mail exchange server. The mail server environment 102 may also include messaging servers, such as a corporate email server using Microsoft Exchange, and enterprise software servers whether located in one or more locations or inside or outside the customer's premises. The client environment 103 may consist of one or more of a desktop, laptop, or other central processing unit coupled with one or more storage devices. For example, the client environment 103 may also include end user client components such as personal digital assistants and other wireless devices. The data managed by the data management application across the managed service environment 101, the mail server environment 102, and the client environment 103 may consist of one or more the original data, a copy of the original data, a watermarked or fingerprint version of the data, an index of the data and metadata.

Figure 2:
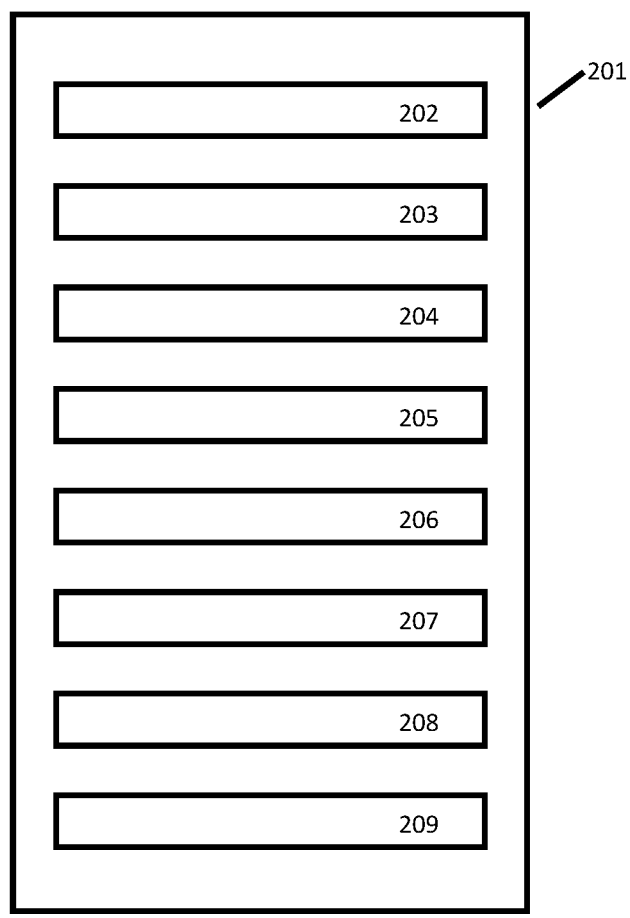
FIG. 2 is a diagram illustrating various functions that may be performed by the data management application in one embodiment of the present invention.

With reference now to FIG. 2, a diagram illustrating various functions that may be performed by the data management application in one embodiment of the present invention is shown. In this embodiment, the data management application 201 include the data management functions of archiving 202, recovering 203, monitoring 204, authenticating 205, synchronizing 206, transferring 207, copying 208, stubbing 209, chunking (not shown), harvesting (not shown), and securing (not shown). The data management application 201 can also include a policy engine and various agents. Importantly, the data management application 201 operates across the managed service environment 101, the mail server environment 102, and the client environment 103.

Figure 3:
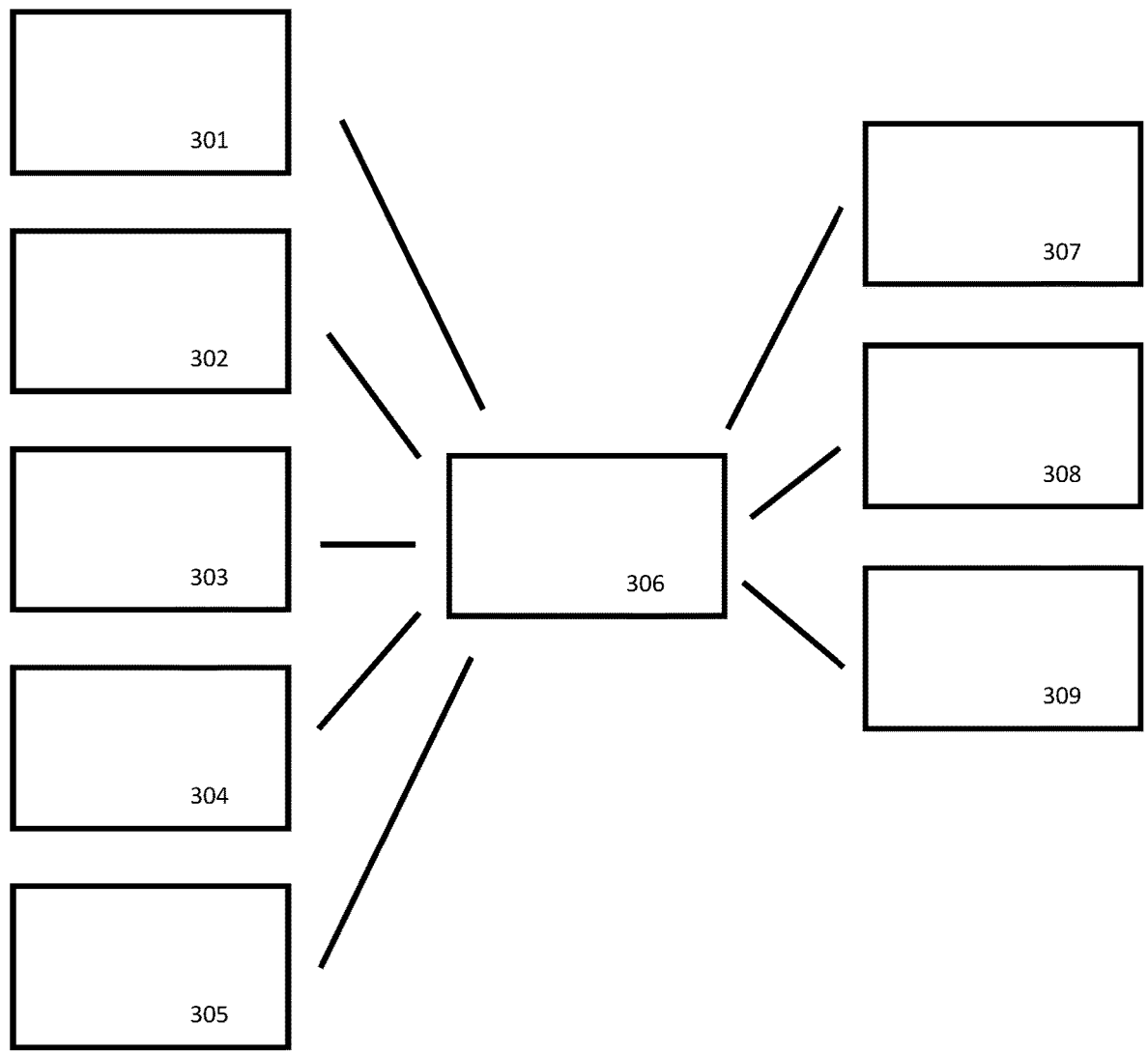
FIG. 3 is a diagram illustrating types of data, the data management application, the managed service environment, the mail server environment and the client environment in one embodiment of the present invention.

With reference now to FIG. 3, a diagram illustrating types of data, the data management application, the managed service environment, the mail server environment and the client environment in one embodiment of the present invention. In this embodiment, the data types include a primary copy 301, a secondary copy 302, an index 303, stubbed data 304, and metadata 305. As discussed above, the index 303, stubbed data 304, and metadata 305 may effectively serve as a finger prints to authenticate the primary copy 301 or the secondary copy 302. These separate data types may consist of one or more of a data file, a voice file, or an email message. The data is managed by the data management application 306. For example, the management may consist of transferring data across one or more environments, storing data in one or more environments, providing access to data across one or more environments, authenticating data across one or more environments, managing data across one or more environments, remotely monitoring data across one or more environments, and synchronizing data across one or more environments. The management may also include chunking the data for optimal storage and encrypting and compressing the data prior to a transfer. In addition, the management may include authenticating that comprises the steps of stubbing the data, storing stubbed data apart from the original of the data, and verifying that the stubbed data match the original of the data. The management of data may be performed using a policy management application. The management of the data may further include controlling access to data stored in a local environment. A local environment may include the mail server environment or the client environment. The management of data may also include a policy impact analysis tool that is capable of evaluating the impact of a local or global change before implementation of the change. The management of data may also include synchronizing between environments in real time or on a periodic basis. In these ways, the data management application 306 optimizes management of data, and various combinations of the data, across the managed service environment 307, the mail server environment 308, and the client environment 309.

What is claimed is:

1. An apparatus comprising:
   a display,
   one or more processors coupled to the display; and
   a memory, coupled to the one or more processors, having code therein that is executable by the one or more processors to perform operations comprising:
   executing an agent on an electronic device capable of receiving email, wherein:
   the agent is integrated with a client email application;
   the agent is distinct from the client email application;
   the agent has at least three modes of operation (1) ready, (2) active, and (3) recovery, wherein:
   in ready mode, sending an output signal to a managed service environment to receive data to remotely configure the agent;
   in active mode, (i) sending messages previously sent from the client email application between failure of a primary email server environment and operation of the agent in the active mode, (ii) inserting email from the managed service environment into an inbox in the client email application, and (iii) transferring the sent email from the primary email server environment to the managed service environment; and
   in recovery mode, reconciling messages not synchronized between the client email application and the primary mail server environment;
   operating the agent in the ready mode to remotely activate the agent;
   presenting a single interface, in a client environment that includes the electronic device, that interacts with a processor of the device to allow a user of the single interface to search emails in the client environment and a primary email server environment and search archived emails in a managed service environment and return a single search query report to report the emails located from both searches;
   storing copies of at least portions of the emails in a backup email system in the managed server environment;
   during a disruption of sending and receiving emails by the primary email server environment and in response to requests to send and receive emails from the client environment, operating the agent in the active mode to (i) contact the backup email system in the managed server environment to begin sending and receiving email from the backup email system and (ii) between failure of a primary email server environment and activation of the agent insert email from the managed service environment into an inbox in the client email application and transfer sent email from the primary email server environment to the managed service environment; and
   after reestablishment of sending and receiving emails by the primary email server environment, operating the agent in the recovery mode to reconcile messages not synchronized between the client environment and the primary email server environment.

2. The apparatus of claim 1 wherein the code is further executable by the one or more processors to perform operations comprising:
   activating a plug-in an email client application executing on the device to perform at least one of:
   creating the single interface as a new search interface;
   interfacing with an existing search interface of the email client application; and
   launching a separate interface that provides search results in response to a request to search the emails.

3. The apparatus of claim 1 wherein the managed server environment comprises multiple managed service servers, the apparatus further comprising:
   removing email data from the email server environment; and
   storing the removed email data among the managed service servers.

4. The apparatus of claim 3 wherein the email data comprises attachments to emails.

5. The apparatus of claim 1 wherein the code is further executable by the one or more processors to perform operations comprising:
   routing the email data to different ones of the managed service servers based on user-defined routing attributes.

6. The apparatus of claim 5 wherein the user-defined attributes comprise routing the email data to at least one of (i) a specific server, (ii) a specific user, (iii) a specific server in a specific country.

7. The apparatus of claim 5 wherein the code is further executable by the one or more processors to perform operations comprising:
   during a loss of the email server environment, moving the copies of the emails from the managed service environment directly to an enterprise server within the email server environment.

8. The apparatus of claim 1 wherein the code is further executable by the one or more processors to peform operations comprising:
   determining authenticity of the stored copies of the at least portions of the emails without requiring that the entire emails be stored outside of the email server environment or the client environment.

9. The apparatus of claim 8 wherein the code is further executable by the one or more processors to peform operations comprising:
   calculating signatures of the emails; and
   storing the signatures in a separate environment from the email server environment determining authenticity of the stored copies further comprises:
   verifying the authenticity of the copies by comparing the digital signatures of the copies with the calculated signatures of the emails.

10. The apparatus of claim 1 wherein the email server environment includes a firewall, and the code is further executable by the one or more processors to peform operations comprising:
    communicating between the managed service environment, the email server environment and the client environment using components behind the firewall to periodically poll email services outside the firewall to determine if messages, actions, or other events are queued for email services inside the firewall.

11. A non-transitory, computer readable medium comprising code stored therein for managing data, wherein when executed by one or more processors, the code causes the one or more processors to perform operations comprising:
    deploying an agent on an electronic device capable of receiving email, wherein:
    when deployed:
    the agent is integrated with a client email application;
    the agent is distinct from the client email application;
    the agent has at least three modes of operation (1) ready, (2) active, and (3) recovery, wherein:

in ready mode, sending an output signal to a managed service environment to receive data to remotely configure the agent;

in active mode, (i) sending messages previously sent from the client email application between failure of a primary email server environment and operation of the agent in the active mode, (ii) inserting email from the managed service environment into an inbox in the client email application, and (iii) transferring the sent email from the primary email server environment to the managed service environment; and in recovery mode, reconciling messages not synchronized between the client email application and the primary mail server environment;

when deployed, the electronic device performs operations including:

operating the agent in the ready mode to remotely activate the agent;

presenting a single interface, in a client environment that includes the electronic device, that interacts with a processor of the device to allow a user of the single interface to search emails in the client environment and a primary email server environment and search archived emails in a managed service environment and return a single search query report to report the emails located from both searches;

storing copies of at least portions of the emails in a backup email system in the managed server environment;

during a disruption of sending and receiving emails by the primary email server environment and in response to requests to send and receive emails from the client environment, operating the agent in the active mode to (i) contact the backup email system in the managed server environment to begin sending and receiving email from the backup email system and (ii) between failure of a primary email server environment and activation of the agent insert email from the managed service environment into an inbox in the client email application and transfer sent email from the primary email server environment to the managed service environment; and after reestablishment of sending and receiving emails by the primary email server environment, operating the agent in the recovery mode to reconcile messages not synchronized between the client environment and the primary email server environment.

12. The non-transitory, computer readable medium of claim 11 wherein the code is further executable by the one or more processors to peform operations comprising:

activating a plug-in an email client application executing on the device to perform at least one of:

creating the single interface as a new search interface;

interfacing with an existing search interface of the email client application; and launching a separate interface that provides search results in response to a request to search the emails.

13. The non-transitory, computer readable medium of claim 11 wherein the code is further executable by the one or more processors to peform operations comprising:

removing email data from the email server environment; and storing the removed email data among the managed service servers.

14. The non-transitory, computer readable medium of claim 13 wherein the email data comprises attachments to emails.

15. The non-transitory, computer readable medium of claim 11 wherein the code is further executable by the one or more processors to peform operations comprising:

routing the email data to different ones of the managed service servers based on user-defined routing attributes.

16. The non-transitory, computer readable medium of claim 15 wherein the user-defined attributes comprise routing the email data to at least one of (i) a specific server, (ii) a specific user, (iii) a specific server in a specific country.

17. The non-transitory, computer readable medium of claim 15 wherein the code is further executable by the one or more processors to peform operations comprising:

during a loss of the email server environment, moving the copies of the emails from the managed service environment directly to an enterprise server within the email server environment.

18. The non-transitory, computer readable medium of claim 11 wherein the code is further executable by the one or more processors to peform operations comprising:

determining authenticity of the stored copies of the at least portions of the emails without requiring that the entire emails be stored outside of the email server environment or the client environment.

19. The non-transitory, computer readable medium of claim 18 wherein the code is further executable by the one or more processors to peform operations comprising:

calculating signatures of the emails; and storing the signatures in a separate environment from the email server environment determining authenticity of the stored copies further comprises:

verifying the authenticity of the copies by comparing the digital signatures of the copies with the calculated signatures of the emails.

20. The non-transitory, computer readable medium of claim 11 wherein the code is further executable by the one or more processors to peform operations comprising:

communicating between the managed service environment, the email server environment and the client environment using components behind the firewall to periodically poll email services outside the firewall to determine if messages, actions, or other events are queued for email services inside the firewall.

* * * * *